United States Patent [19]

Fourrey et al.

[11] Patent Number: 4,736,985
[45] Date of Patent: Apr. 12, 1988

[54] CONVERTIBLE REAR SEAT

[75] Inventors: Francois Fourrey, Montbeliard; Serge Deley, Beaucourt, both of France

[73] Assignee: Cycles Peugeot, Valentigney, France

[21] Appl. No.: 927,982

[22] Filed: Nov. 7, 1986

[30] Foreign Application Priority Data

Nov. 8, 1985 [FR] France ............... 85 16579

[51] Int. Cl.$^4$ .................................... A47C 1/02
[52] U.S. Cl. ...................... 297/331; 296/69; 297/334; 297/379
[58] Field of Search .................. 296/69; 297/331, 379, 297/334

[56] References Cited

U.S. PATENT DOCUMENTS

| | | | |
|---|---|---|---|
| 3,140,114 | 7/1964 | Stephenson | 296/69 |
| 3,282,625 | 11/1966 | Logan | 296/69 |
| 4,037,872 | 7/1977 | Quakenbush | 297/65 |
| 4,052,102 | 10/1977 | Rosenthal | 297/334 |
| 4,273,376 | 6/1981 | Duguet et al. | 297/331 |
| 4,518,201 | 5/1985 | Wahlmann et al. | 297/334 X |

FOREIGN PATENT DOCUMENTS

| | | |
|---|---|---|
| 669589 | 12/1940 | Fed. Rep. of Germany . |
| 1066882 | 10/1959 | Fed. Rep. of Germany . |
| 2617942 | 10/1977 | Fed. Rep. of Germany ...... 297/334 |
| 906776 | 1/1946 | France . |
| 1298008 | 5/1962 | France . |
| 1522571 | 3/1968 | France . |
| 2384645 | 11/1978 | France .................. 297/334 |

Primary Examiner—James T. McCall
Attorney, Agent, or Firm—Sughrue, Mion, Zinn, Macpeak, and Seas

[57] ABSTRACT

This set includes a rear foot (4) which is an extension of the back-rest and which is connected by a rod (10) articulated to a front foot (14) articulated to the floor of the vehicle. Retractable locks (20, 32, 28) retain, on the one hand, the articulation (16) of the front foot with the rod under the seat-bottom (1), and, on the other hand, the rear foot against the seat-bottom and against the floor. When these two latter locks are opened, the seat can pivot on the articulation placed under the seat-bottom and can be folded behind the front seat. When the lock (28) of the rear foot and that (20) of the seat are disengaged, the seat-back pivots about its articulation with the seat-bottom and the latter rises so as to form a couchette.

9 Claims, 4 Drawing Sheets

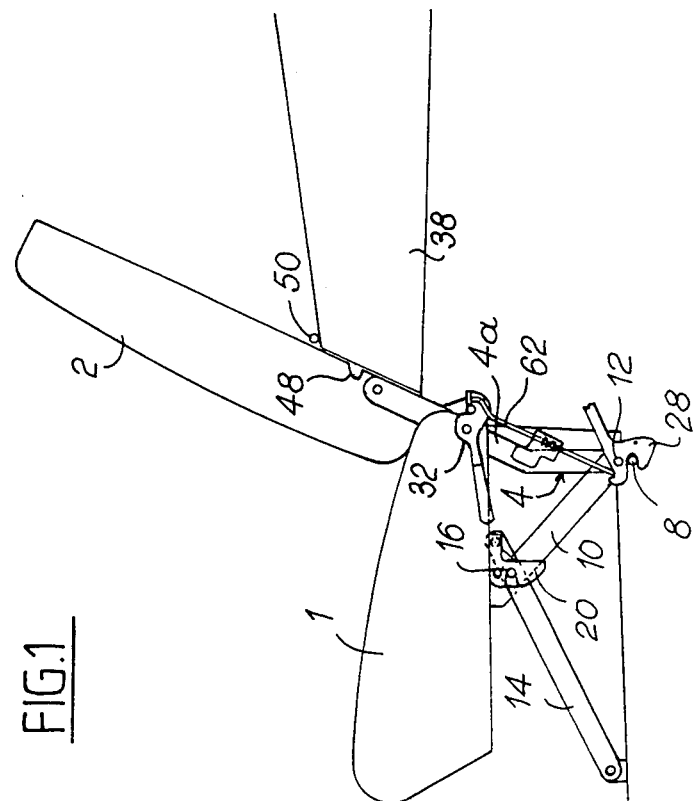
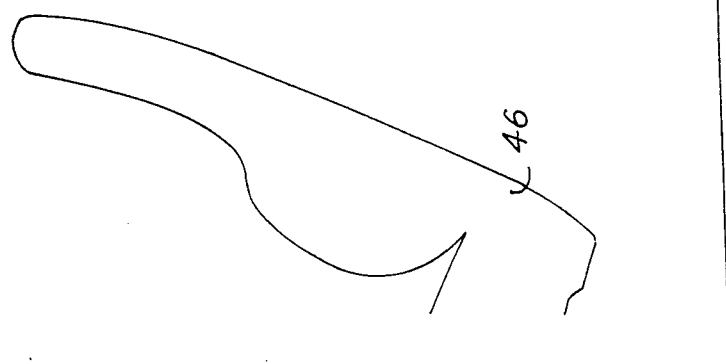
FIG.1

CONVERTIBLE REAR SEAT

BACKGROUND OF THE INVENTION

Car owners appreciate more and more being able to have a rear seat which can be folded so as to provide a useful space as an extension of the boot, and equally being able to convert the seats into a couchette, for example, for travelling at night. Obtaining a couchette in an automobile vehicle is at present the result of tipping the back-rest of one of the front seats towards the rear seat, which considerably reduces the space remaining available and, furthermore, requires particular arrangements for controlling the tipping of the back-rest of the front seat and the folding of the rear seat when it is desired to have both possibilities available.

SUMMARY OF THE INVENTION

The object of the present invention is to enable a couchette to be obtained inside an automobile vehicle, even without displacing the front seat, by acting on only a rear seat which can as desired be converted into a couchette or be folded so as to free the rear space.

The invention, in effect, provides a convertible rear seat, which includes a rear foot formed by an extension of the back-rest, which, with the help of retractable locking devices, is, on the one hand, held against the floor of the vehicle, and, on the other hand, connected in a pivoting manner to the bottom of the seat; a front foot mounted to pivot on a fixed point of the floor and connected to the end of the rear foot by a rod articulated at both its ends to said feet; and a retractable device mounted under the bottom of the seat to connect the latter to one or the other of said articulations of the rod, according to the angular position of the rear foot and of the back-rest in relation to the bottom of the seat and to the floor.

In the normal position of the seat, the three retractable locking devices are in the active position, the articulation of the rod on the front foot being held under the bottom of the seat while the rear foot is fixed rigidly to this bottom. Freeing the rear foot accompanied by retraction of one or the other of the retractable devices enables, either the folding of the rear seat against the front seat, or its displacement into the couchette position. In effect, freeing the connection between the bottom of the seat and the rear foot enables the bottom of the seat and the back-rest to be pushed into a more or less vertical position behind the front seat, while freeing the front foot held under the bottom of the seat and fixing the device on the articulation between the rod and the lower part of the rear foot causes the back-rest to tip and the bottom of the seat to rise, which places them as an extension of each other in a more or less horizontal couchette position.

According to another characteristic of the invention, the back-rest is connected to the bottom of the seat by articulated links.

Furthermore, the front foot is extended beyond its articulation on the connecting rod and thus forms a support for the front of the seat bottom in the couchette position.

BRIEF DESCRIPTION OF THE DRAWINGS

The description below of an embodiment, given as a non-limiting example, and shown on the attached drawings, will better explain the advantages and characteristics of the invention.

In these drawings:

FIG. 1 is a schematic view of the side of a convertible seat according to the invention, mounted inside a vehicle;

DESCRIPTION OF A PREFERRED EMBODIMENT

Figure 2:
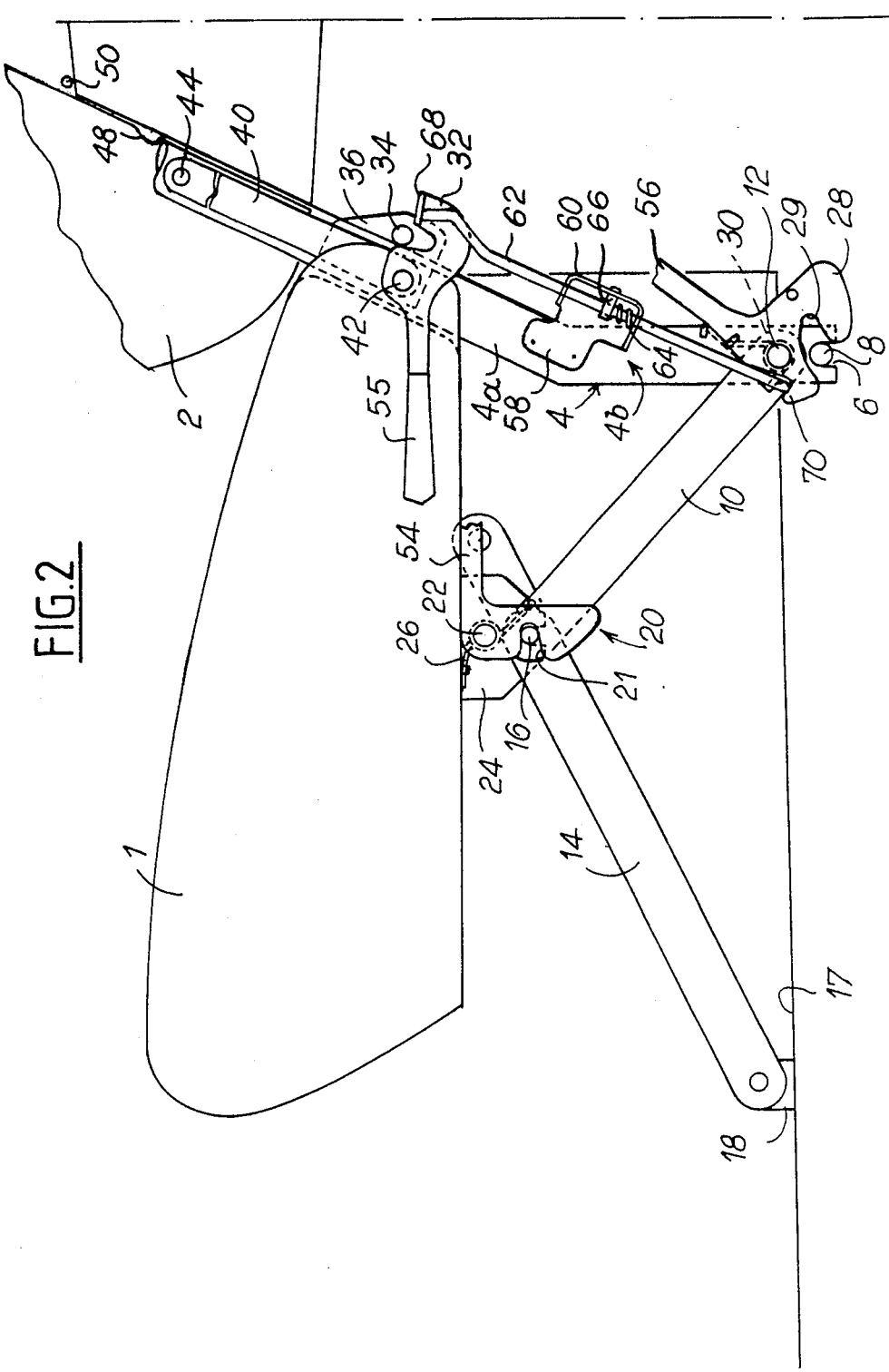
FIG. 2 is a detail view to a larger scale, showing the support mechanism for the seat of FIG. 1, the rear foot of which is unlocked.

As the drawings show, the seat according to the invention comprises a seat bottom 1 and a back-rest 2 which can be displaced in relation to each other. The back-rest 2 is extended in its lower part by a foot 4 formed, for example, by the ends of lateral branches of its frame. The rear foot 4, at its opposite extremity to the back-rest 2, has a notch 6 intended to engage with a stud 8 or anchoring means fixed to the floor of the vehicle.

Preferably, as shown, the foot 4 comprises an arm 4a parallel to the rear part of the back-rest, and an arm 4b forming an obtuse angle with the arm 4a, so as to be more or less vertical in the normal position of the seat (FIG. 2).

In the neighbourhood of its notch 6, the arm 4 is articulated to a rod 10 by means of a pin 12 and it is thus connected to a front foot 14, itself articulated by a pin 16 to the opposite end of the connecting rod 10. The front foot 14 is mounted to pivot on the floor 17 of the vehicle, for example, by means of a fork 18 under the front part of the seat bottom 1.

The articulation pin of the front foot 14 and of the connecting rod 10 is held against the bottom 1 of the seat by means of a retractable locking device 20 formed by a catch provided with a notch 21 and articulated under the seat bottom 1 by means of a pin 22 carried by a fitting 24. The size of the notch 21 is such that it easily engages on the pin 16. In addition, a spring 26 constantly tends to push the catch 20 back in the direction of this pin.

In the same way, a retractable locking device 28 in the form of a catch, provided with a notch 29 is pivoted on the pin 12 of articulation of the rod 10 on the rear foot 4, a spring 30 constantly pressing this catch into the locking position, that is to say, engaging the notch 29 with the stud 8.

The rear foot 4, rigid with the back-rest 2, is further connected to the bottom 1 of the seat by means of a retractable locking device 32, in the form of a catch, articulated to the seat bottom, which cooperates with a stud 34 carried by a plate 36 integral with the foot 4, a spring, not visible on the figure, pressing the catch 32 in the direction of this stud.

When the catches 20, 28 and 32 are thus applied on the corresponding pins or studs, the bottom and the back-rest of the seat are held in a fixed position and are solidly supported on the floor of the vehicle. Preferably, the back-rest 2, as shown in FIG. 1, is parallel to a part of the body of the vehicle, for example the wheel arches, and may even lean in at its lower part against these arches 38.

The back-rest 2 and the rear part of the seat bottom 1 are further connected together by connecting means in form of links 40 articulated on the seat bottom 1 about the articulation pin 42 of the catch 32, and on the back-rest 2 about a pin 44 near to the rear part of the back-rest.

Figure 3:
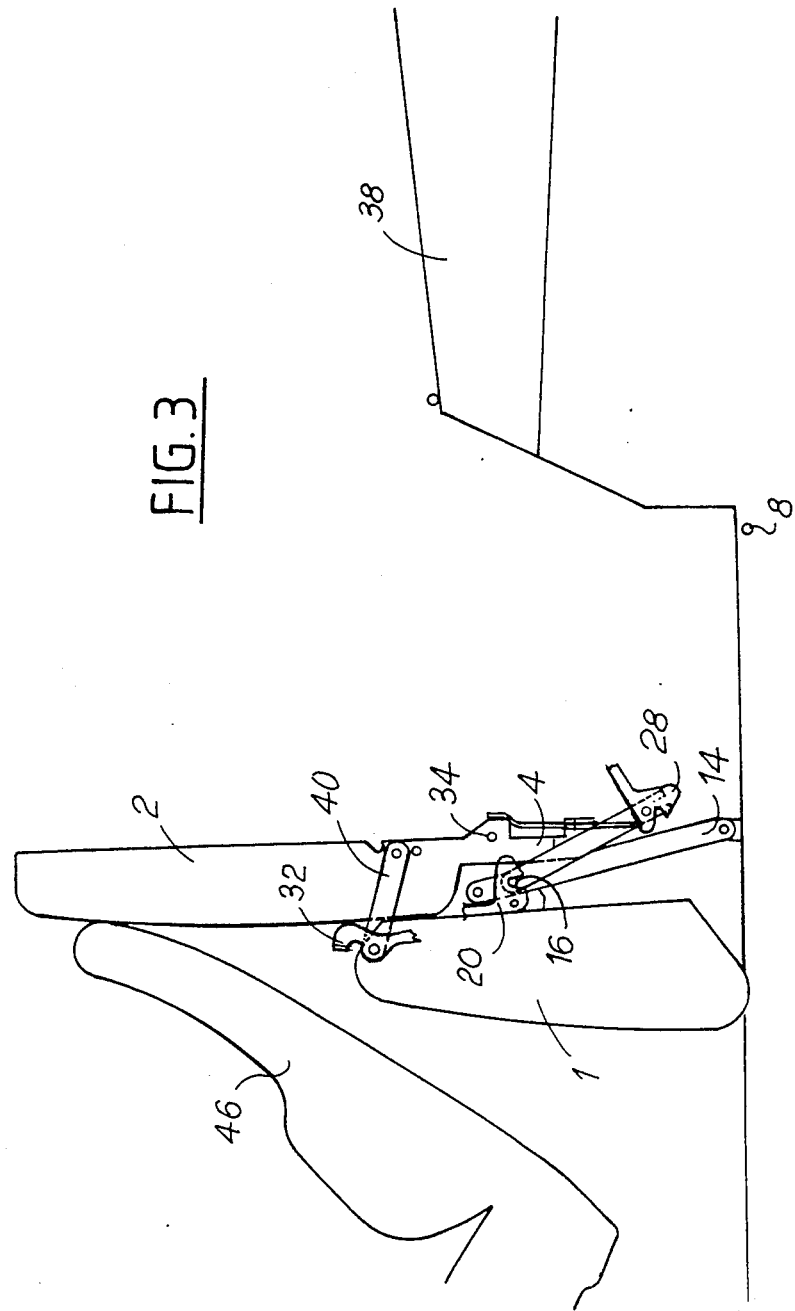
FIG. 3 is a view, similar to FIG. 1, showing the rear seat in the folded position.

If, as represented on FIG. 2, the catches 32 and 28 are rocked so as to be disengaged respectively from the studs 34 and 8, the rear foot 4 is freed from the seat bottom 1. The back-rest 2 can then be pushed forwards while being slightly lifted, so as to lift up the rear part of the seat bottom and to cause the latter to rock about the articulation pin 16 of the front foot 14 and the connecting rod. The rear foot 4 is pushed, together with the back-rest 2 and the seat bottom 1, and the latter thus rocked into a more or less vertical position, towards the front seat 46. In this movement, the articulated assembly formed by the front foot 14, the rod 10 and the rear foot 4, is folded onto itself in such a way that the back-rest 12 places itself parallel to the seat bottom 1, as shown in FIG. 3, the links 40 in addition keeping these two parts one against the other. The seat assembly is thus closed up and disengages the rear space which it previously occupied.

An inverse movement is obtained by pulling the back-rest 2 towards the rear and by slightly lifting it, thereby, at the same time, making the seat bottom rock towards its horizontal position and making the catch 32 pass under the stud 34 which is rigid with the rear foot 4. The articulated system deploys itself again and when the notch 6 of the foot 4 is opposite the stud 8, the catch 32 again engages with the stud 34 and the whole takes up the position represented on FIG. 1, the three retractable locking device again being in the active position.

However, when it is desired to use the seat as a couchette, the catch 28 is again retracted so as to free the foot 4 from the floor of the vehicle. Similarly, the catch 20 is moved away against the action of the spring 26 so as to free the pin 16. A force is then exerted so as to lift slightly the back-rest 2, then to make it pivot in relation to the seat bottom 1 about the stud 34 which, since it is engaged in the catch 32, acts at that time as an axis of articulation between the back-rest and the seat bottom.

Figure 4:
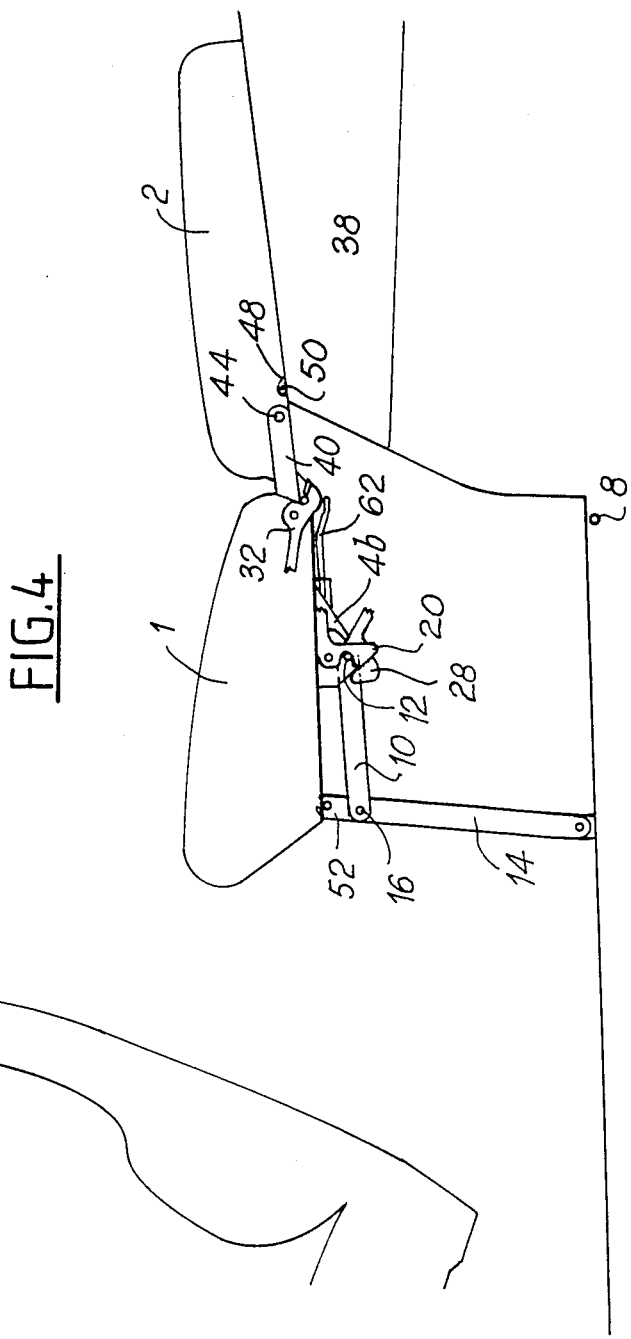
FIG. 4 is a view similar to FIG. 1, showing the rear seat in the couchette position.

Preferably, in order to facilitate this movement, the rear part of the back-rest 2 includes a notch 48 which is progressively engaged on a stud 50 mounted on the upper part of the wheel arch, or the like. The back-rest 2 then turns about this stud 50, which displaces the foot 4 until its upper arm 4a is parallel to the lower face of the seat bottom 1 and leans against this latter. The articulation pin 12 of the rear foot 4 on the rod 10 is then brought to the region of the catch 20 and engaged in the notch 21 of this lock, as shown in FIG. 4.

This displacement of the rear foot 4, which has caused a forward movement of the rod 10, has also caused a pivoting of the front foot 14 about its articulation axis on the floor. This foot 14 preferably extends beyond its articulation 16 on the rod 10, and thus forms a support 52 for the front part of the seat bottom 1, when the rod 10 has reached a position more or less horizontal between the catch 20 and the front foot 14. At this time, the back-rest 2 rests practically on the wheel arches 38 and is in an extension of the seat bottom 1, so that they form a couchette in the rear part of the vehicle.

This couchette can at any moment be converted by a simple unlocking of the catch 20 and a pivoting in the opposite direction of the back-rest 2 about the stud 50, which makes the foot 4 descend again towards the stud 8 on the floor. During this descent, the foot 4 brings with it the rod 10 which makes the front foot 14 pivot until the pin 16 again finds its initial place represented on FIGS. 1 and 2. The seat bottom 1 having descended during this pivoting, the catch 20 can again be fixed on the pin 16.

Each of the catches 20, 28 and 32 is provided with an operating handle, respectively 54, 55 56, and can thus be displaced manually at will. Nevertheless, according to a preferred method of realisation, the rear foot 4 supports a fitting 58 which forms a support stirrup 60 for a rod 62 which goes through the stirrup and is pushed outwards from the latter towards the catch 32 by a spring mounted between the stirrup and a ring 66 integral with the rod 62.

The rod 62 has a length such that under the action of this spring it comes against a heel 68 of the catch 32, and that, on the other side of the stirrup 60, it terminates close to a hook 70 of the catch 28.

In the normal position of the seat, that is to say, in the position represented on FIG. 1, the rod 62 is not in contact with the hook 70. On the other hand, as soon as the handle 55 of the catch 32 is operated to move this away from the stud 34, the rod 62 is pushed against the hook 70 and thus acts on the catch 28, moving this away from the stud 8. A single operation is thus sufficient to disengage entirely the rear foot 4.

In the same way, the catch 20 and the catch 28 could be connected together in such a way that operating the handle 54 of the catch 20 causes simultaneously the unlocking of the catch 28. In this way, a particularly simple control is obtained of the displacements of the different parts of the seat and of the conversion of the seat according to the desired use.

Naturally, this rear seat can consist of a bench occupying the whole width of the vehicle and leaning against the two wheel arches of this vehicle, or it could consist simply of an individual seat which, in the couchette position, will rest only on one of the wheel arches, a prop, or any similar member, being added to ensure a sufficiently effective support.

Similarly, the couchette can, if desired, be completed, or, more exactly, extended by the front seat by rocking the back of the latter towards the rear in the usual manner.

What is claimed is:

1. In a vehicle having a body defining a floor:
a rear seat structure convertible between a seat position and a couchette position and comprising a seat bottom having a front part and a rear part, a back-rest having a lower part, pivotal correcting means pivotally connected said back-rest to said seat bottom, an assembly for mounting said seat bottom and said back-rest to said floor and comprising anchoring means fixed to said floor, a rear foot which is rigid with said back-rest, extends from said lower part of said back-rest, is located adjacent to said rear part of said seat bottom, and has a lower anchoring end rempote from said back-rest and removably engageable with said anchoring means, a front foot having a first end and a second end opposed to said first end, a first articulation articulating said first end of said front foot to said floor, a connecting rod having a first end and a second end opposed to said first end of said connecting rod, a second articulation articulating said first end of said connecting rod to said front foot adjacent to said second end of said front foot, and a third articulation articulating said second end of said connecting rod to said rear foot adjacent to said anchoring end thereof, a first retractable locking device for detachably locking selectively said second articulation to said seat bottom in said seat position of said seat structure and said third articulation to said seat bottom in said couchette position of said seat structure, a second retractable locking device for detachably locking said rear part of said seat bottom to said rear foot, and a third retractable locking device for detachably locking said anchoring end of said rear foot to said anchoring means, and means for supporting said back-rest in said couchette position of said seat structure.

2. A seat structure according to claim 1, wherein said pivotal connecting means comprise link means having one end pivoted to said rear part of said seat bottom and an opposite end pivoted to said lower part of said back-rest, whereby said seat structure is swingable from said seat position and to a third position for clearing space behind said seat structure in said vehicle when said first retractable locking device locks said second articulation to said seat bottom, said link means being so positioned relative to said seat bottom and to said back-rest as to allow said back-rest to be positioned to the rear of said seat bottom in a substantially upright position of said back-rest and seat bottom.

3. A seat structure according to claim 1, wherein said front foot is extended beyond said second articulation and thereby constitutes a support for said front part of said seat bottom when said first retractable locking device locks said second articulation to said seat bottom.

4. A seat structure according to claim 1, wherein each retractable locking device comprises a catch defining a notch and said second and third articulations comprise articulation pins engageable with the respective notch of the catch of said first retractable locking device, a stud is mounted on said rear foot and is engageable in the respective notch of the catch of said second retractable locking device, and said anchoring means comprise a stud secured to said floor and engageable in the respective notch of the catch of the third retractable locking device, spring means being provided in said retractable locking devices for biasing said notches of said catches into engagement with the respective pins and studs.

5. A seat structure according to claim 2, wherein said front foot, said connecting rod and said rear foot constitute an articulated system which is folded upon itself in said third position of said seat structure.

6. A seat structure according to claim 1, wherein said anchoring end of said rear foot defines a notch, and said anchoring means define a stud fixed to said floor and engageable in said notch of said rear foot.

7. A seat structure according to claim 1, comprising a rod interconnecting said second retractable locking device and said third retractable locking device so that operation of one of said retractable locking devices causes the operation of the other of said retractable locking devices interconnected by said rod.

8. A seat structure according to claim 1, further comprising a handle provided for each locking device for retacting the respective retractable locking device.

9. A seat structure according to claim 1, further comprising a stud carried by said body of said vehicle, and a notch provided in a rear part of said back-rest for engaging said stud carried by said body, which stud defines a pivoting axis for said back-rest when shifting said seat structure from said seat position to said couchette position.

* * * * *